(No Model.)
E. H. GOWING.
INDICATOR PISTON AND ATTACHMENT.
No. 340,665. Patented Apr. 27, 1886.
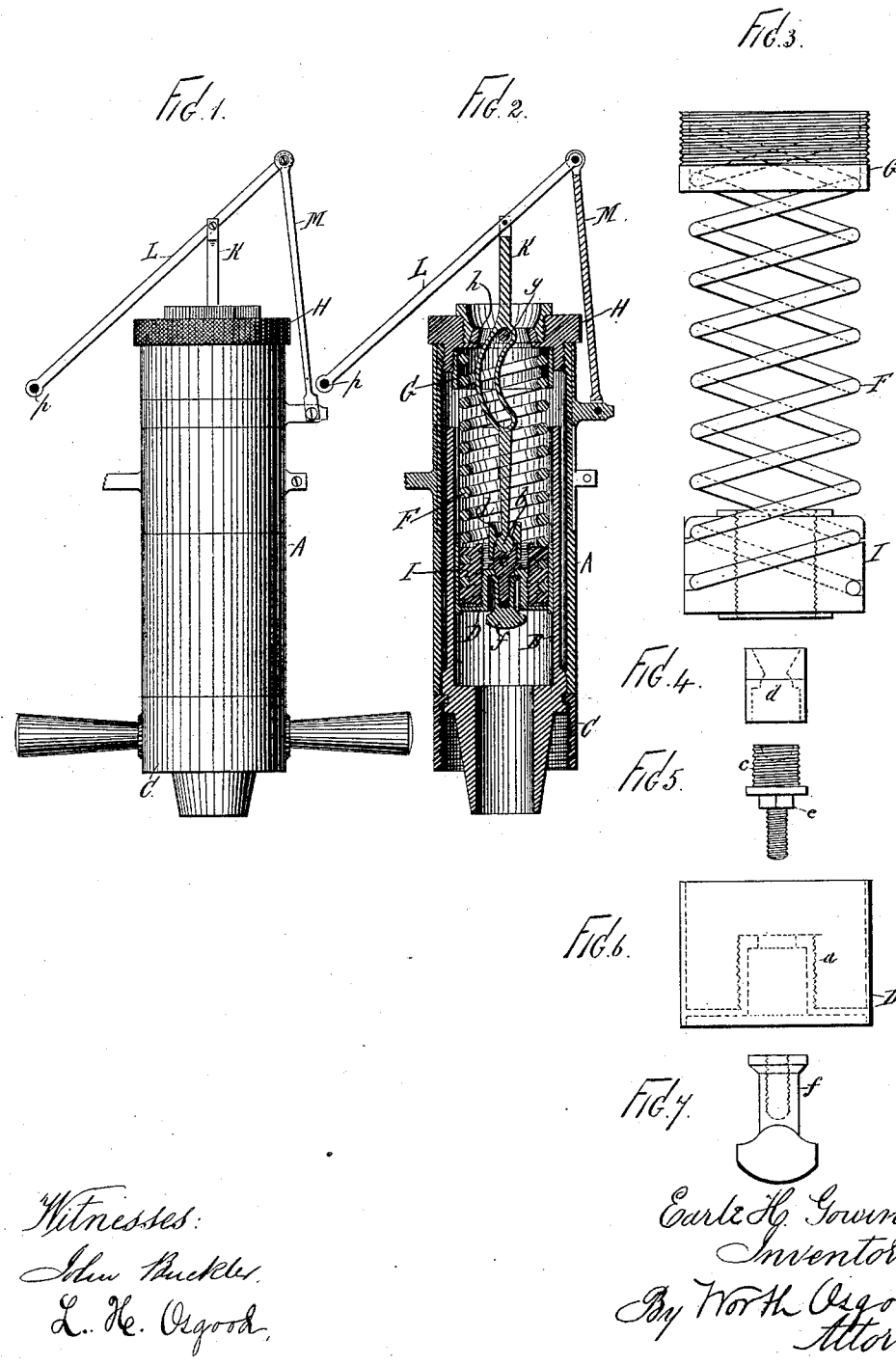

UNITED STATES PATENT OFFICE.

EARLE H. GOWING, OF READING, ASSIGNOR TO THE ASHCROFT MANUFACTURING COMPANY, OF BOSTON, MASSACHUSETTS.

INDICATOR-PISTON AND ATTACHMENT.

SPECIFICATION forming part of Letters Patent No. 340,665, dated April 27, 1886.

Application filed September 29, 1884. Serial No. 144,228. (No model.)

*To all whom it may concern:*

Be it known that I, EARLE H. GOWING, of Reading, county of Middlesex, and State of Massachusetts, have invented certain new and useful Improvements in Indicator Pistons and Attachments, of which the following is a full, clear, and exact description, reference being had to the accompanying drawings, and to the letters of reference marked thereon.

My invention has relation to that class of devices or implements commonly known as "indicators," and principally employed in connection with steam and other engines for the purpose of indicating or recording the pressure of steam or other fluid within the cylinder when the piston is at any of its various points of travel during the working of the engine, and also employed in other situations for analogous purposes, as is well understood. The importance of this class of implements in enabling one to determine the most economical point of cut-off of steam or other fluid under pressure, and thereby to economically regulate the consumption of fuel, is well recognized by those skilled in the art in which these indicators are employed. The implements are essentially implements of precision, and the value and importance of eliminating sources of error in their workings or indications need not here be enlarged upon. The travel of the piston within the indicator is due of course to the pressure of steam or fluid thereon, and it is manifest that if the piston or the parts connected therewith be too heavy their momentum under the influence of the pressure will be great and the piston will be carried beyond the proper point for making a proper record, and while traveling beyond this point the main or engine piston continues its motion, so that the ascending and descending scale intended to represent the variations in pressure must both be erroneous.

Now, the principle object of my invention is to eliminate this source of error in the operation of indicators, and secondary objects are the provision of simple, cheap, and effective means of connecting the indicator-piston with its returning-spring, and also means similarly characterized for connecting the improved piston with the piston-rod through the medium of which the pointer or scale-marker is operated.

To accomplish these objects my improvements involve certain novel and useful peculiarities of construction, relative arrangements or combinations of parts, and principles of operation, all of which will be herein first described, and then pointed out in the claims.

In the accompanying drawings, forming part of this specification, Figure 1 is an elevation of the cylinder of the indicator which contains the piston; and Fig. 2 is a vertical sectional elevation of the same, showing the working parts within and assembled for use. Fig. 3 is an elevation on a scale, enlarged beyond Figs. 1 and 2, of the spring which operates upon the indicator-piston, showing the upper and lower connecting-pieces mounted thereon. Fig. 4 is an elevation of the cap which is employed to secure the piston upon the socket-piece. Fig. 5 is an elevation of the socket-piece. Fig. 6 is an elevation of the piston, and Fig. 7 an elevation of the coupling-nut by means of which the socket-piece is connected with the piston. Figs. 4, 5, 6, and 7 are each upon the scale corresponding with Fig. 3.

In all these figures like letters of reference wherever they occur indicate corresponding parts.

I have not deemed it necessary to illustrate the means employed for carrying the paper or other material for the chart or scale, inasmuch as those means may be of any construction or mode of operation.

A is the exterior shell of the indicator-cylinder, and B is the inner shell, within which the piston is accurately fitted and within which it moves up and down or back and forth. These two parts are preferably threaded together at their base, so that they may be readily detached one from the other, and they are coupled to the steam-cylinder or conduit or chamber by any suitable form of coupling—as by the coupling-nut represented at C.

D is the piston having an interior cylindrical projection, *a*, the outer surface of which projection is threaded and fitted to engage with the connecting-piece secured upon the lower end of the spring. This projection *a* rises from the bottom of the shell of the piston, extends up into the body of the piston, and is made hollow, for the accomodation of the thumb-nut, to be hereinafter described. As above indicated, it is important that the piston should be made as light as possible, at the same time having the requisite degree of hardness or durability, and be capable of withstanding the injurious effects which may arise from contact therewith of steam or other fluid and from variations in temperatures to which it may be subjected. For this purpose I have discovered that the metal aluminum is in all respects best adapted to answer the above-named requisites, and I make the piston of aluminum.

F is the returning-spring, provided at top with the fitting G, by which it is arranged to be secured upon the removable cap-piece H at the top of the exterior cylinder. Inasmuch as this fitting remains immovable while the apparatus is at work, it may be made of brass or any suitable metal, and the spring affixed to it in any suitable way.

At I is the lower fitting. As this travels with the piston, it is also made of aluminum in order to insure its lightness. It is connected with the spring in an immovable manner, receiving the coils of the spring in suitable perforations, substantially as indicated, and the two parts being soldered together by any of the known methods for uniting aluminum with other metal. This lower fitting supplies a means for uniting the piston with the spring, the threaded neck $a$ of the piston entering the threaded central perforation in the said fitting I.

K is the piston-rod, having a ball, $b$, at its lower end, the same being secured to the socket-piece $c$ by a cap, $d$, forming a ball-and-socket joint therewith. The socket-piece $c$ has an angular portion, $e$, which enters the corresponding opening in the neck $a$ and is secured to said neck by means of a coupling or thumb-nut, $f$, which receives the lower threaded neck of said socket-piece, and when in place bears against the ledge upon the upper end of said neck. In this manner the piston is rigidly secured upon the spring and the piston-rod connected with the piston in such manner as to allow for all required movements in the rod.

At $g$ is a cross-pin located in the rotating plate $h$. The piston-rod shown has a curved slot near its upper end and moves upon the pin $g$ in a manner to guide the extremity of the piston, so as to secure in connection with the other parts what is called the "parallel movement" in the pointer.

L is the pencil-bar connected with the piston and carrying a pencil or pointer, as at $p$.

M is the back link, connected with the pencil-bar and controlling the latter in its various movements under the influence of the piston. Nothing is claimed on this particular means of securing the parallel movement, and any other suitable means for the same purpose may be adopted.

The construction and arrangement above indicated is found in practice to facilitate manufacture, assembling or dismounting of the parts, and above all to secure that extreme lightness of the moving piston and its connections which is necessary for the purpose of affording a reliable indication.

The cap, the socket-piece, the piston-rod, the thumb-nut, the pencil-bar, and the back link may each and all be made of aluminum, if desired, or any one of these parts may be made of aluminum and be within the scope of my invention.

While pure aluminum is most preferred for the manufacture of the parts or either of them named above, it is manifest that a light alloy might be used with very good results and without departing from my invention.

It should be understood that the invention contemplates (aside from particular constructions or combinations, which are made the subject of claims below) the use of aluminum or aluminum alloy in the manufacture of any of those parts of the indicator which by their weight may influence the travel of the piston, and this without reference to the mere mechanical construction or arrangement of said parts, which may be of the character indicated in the drawings or of any other form or manner of operation. The best results will of course be obtained by making all of said parts of aluminum or aluminum alloy; but any one of them being so made will remove its proportionate share of the source of error.

Having now fully described my invention, what I claim as new, and desire to secure by Letters Patent, is—

1. In an indicator, the piston and the movable parts, viz: the socket-piece, cap-piece, thumb-nut, piston-rod, and lower spring-fitting connected with said piston, any one or all of said parts being made of aluminum or aluminum alloy, substantially as and for the purposes set forth.

2. The combination of the piston having the inwardly-projecting neck, the socket-piece, thumb-nut, cap, and piston-rod having the ball at its lower end, all arranged to be united, substantially as and for the purposes set forth.

3. In an indicator of the character herein set forth, the combination, with the returning-spring, of an aluminum or aluminum-alloy fitting applied upon its lower end, and an aluminum or aluminum-alloy piston having the hollow neck extending up into the body of the piston and arranged to be coupled with said fitting, substantially as and for the purposes set forth.

In testimony that I claim the foregoing I have hereunto set my hand in the presence of two witnesses.

EARLE H. GOWING.

Witnesses:
MARTIN LUSCOMB,
ARTHUR M. FLINN.